United States Patent [19]
Hirai et al.

[11] Patent Number: 5,384,874
[45] Date of Patent: Jan. 24, 1995

[54] OPTICAL FIBER ROD LENS DEVICE AND METHOD OF MAKING SAME

[75] Inventors: Shigeru Hirai; Toshiaki Kakii; Shinji Ishikawa; Hiroo Kanamori, all of Kanagawa, Japan

[73] Assignee: Sumitomo Electric Industries, Ltd., Osaka, Japan

[21] Appl. No.: 80,120

[22] Filed: Jun. 23, 1993

[30] Foreign Application Priority Data

Jun. 24, 1992 [JP] Japan .................................. 4-166395
Sep. 14, 1992 [JP] Japan .................................. 4-244795

[51] Int. Cl.⁶ .......................... G02B 6/26; C03B 23/20
[52] U.S. Cl. .......................................... 385/34; 385/11; 385/31; 385/33; 385/96; 385/85; 65/407
[58] Field of Search ............... 385/31, 33, 34, 95, 385/96; 65/3.11, 3.12, 4.1, 4.2

[56] References Cited

U.S. PATENT DOCUMENTS

| | | | |
|---|---|---|---|
| 4,327,963 | 5/1982 | Khoe et al. | 385/33 X |
| 4,575,194 | 3/1986 | Streifer et al. | 385/33 |
| 4,701,011 | 10/1987 | Emkey et al. | 350/96.18 |
| 4,946,239 | 8/1990 | Garmon | 385/43 X |
| 4,962,988 | 10/1990 | Swan | 385/34 |
| 5,039,193 | 8/1991 | Snow et al. | 385/33 |
| 5,163,107 | 11/1992 | Garriss | 385/34 X |
| 5,172,271 | 12/1992 | Sinclair | 385/34 X |
| 5,181,264 | 1/1993 | Chiaretti et al. | 385/33 |
| 5,299,272 | 3/1994 | Buchin | 385/34 |
| 5,315,609 | 5/1994 | Tanaka et al. | 385/34 X |
| 5,317,452 | 5/1994 | Prentiss et al. | 385/34 X |

FOREIGN PATENT DOCUMENTS 0370663  5/1990  European Pat. Off. .......... 385/33 X

*Primary Examiner*—Brian Healy
*Attorney, Agent, or Firm*—Cushman Darby & Cushman

[57] ABSTRACT

In an optical fiber functional device for processing a light beam between optical fibers, single-mode optical fibers for processing the light beam are concentrically connected at the mutually opposed ends to convergence-type rod lenses each having a prescribed length and made of a graded-index optical fiber.

9 Claims, 8 Drawing Sheets

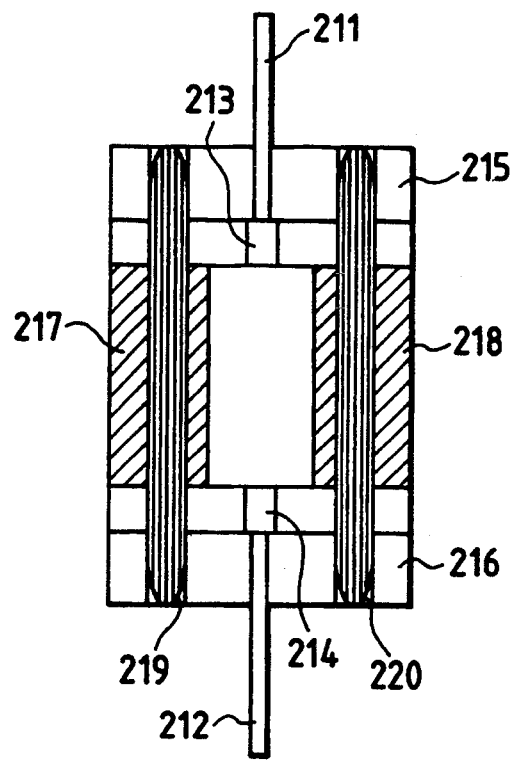
FIG. 11
FIG. 12(A)
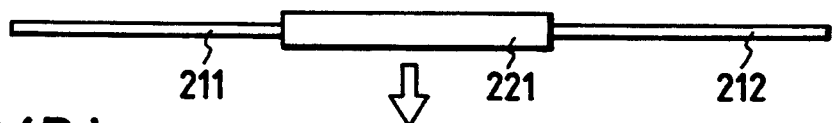
FIG. 12(B)
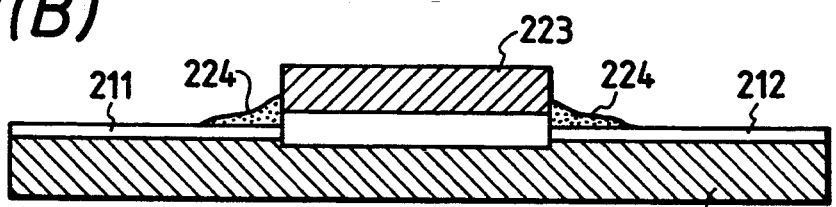
FIG. 12(C)
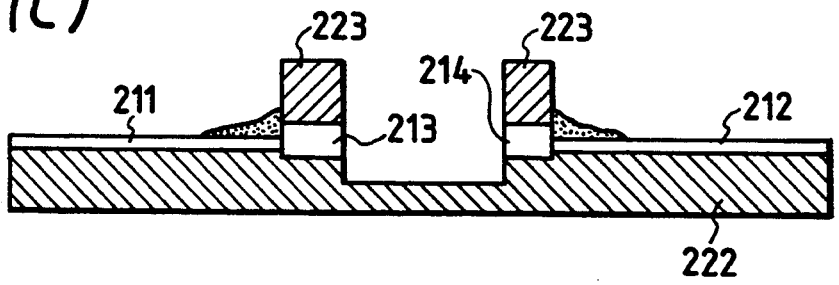

1

OPTICAL FIBER ROD LENS DEVICE AND METHOD OF MAKING SAME

BACKGROUND OF THE INVENTION

The present invention relates to an optical fiber functional device and a method of manufacturing the same, and more particularly relates to an optical fiber functional device capable of being used to form a parallel beam converter system in disposing a functional optical element such as an optical isolator in an optical fiber wave-guide for optical communication, and a method of manufacturing the same.

It is known that if a semiconductor laser unit, which is a main light source for optical fiber communications, optical disk input and output or the like, receives reflected light back from the end of an optical fiber connected to the laser unit, the point of connection of optical fibers, or an optical system such as a coupling lens and an optical connector, the oscillation of the unit becomes so unstable that it undergoes a large operational deterioration such as an increase in noise and a fluctuation in output. Therefore, various optical isolators have been developed to prevent the oscillation of the semiconductor laser unit from becoming unstable due to the reception of the reflected light, to make the unit be a stable light source for optical communication.

Although an optical isolator including a Rochon's prism as a polarizer or an analyzer, a Faraday-effect rotator made of a single crystal of YIG (yttrium-iron garnet), bismuth-substituted yttrium-iron garnet or the like, and a holed permanent magnet made of SmCo or the like to magnetize the rotator in the forward direction is widely known, the isolator is only effective for a certain plane of polarization, and has a problem that if light not coincident with the direction of polarization of the isolator enters into it, the light undergoes a large loss in passing through the isolator. For use between optical fibers, an optical isolator with no dependence on polarization has been desired because a light beam, which is transmitted through the optical fibers, has generally the changed plane of polarization.

Thus, various optical isolators, in each of which the separation and/or synthesis of ordinary and extraordinary rays obtained by a flat plate of double refraction crystal such as calcite or an artificial anisotropic medium instead of a Rochon's prism are utilized to eliminate almost all of the loss of light in the forward direction as to all the planes of polarization so as to make the isolator not dependent on polarization, have been proposed.

FIG. 1 shows a conventional optical isolator disclosed in Japanese Patent Publication No. 28561/83 and including a lens 10, two flat plates 11 and 12 of double-refraction rutile crystals, a Faraday-effect rotator 13 which is a magnetooptic member, and an optically rotatory plate 14 of optically rotatory or anisotropic crystal such as quartz.

In the isolator, the direction of polarization of light from an optical fiber 8 as a light passage is changed by an angle of 45 degrees clockwise by each of the rotator 13 and the optically rotatory plate 14. The flat plates 11 and 12 of double-refraction rutile crystals have the same thickness, and are tilted by a prescribed angle to the optical axis of the isolator so that the axes of the plates are parallel with each other to prevent light from proceeding from another optical fiber 9 to the optical fiber 8.

FIG. 2 shows another conventional optical isolator disclosed in the Japanese Patent Publication No. 58809/86 and including lenses (a) and (b), two double-refraction crystal plates 11, and a Faraday-effect rotator 13. Each of the plates 11 is shaped as a wedge. The oblique sides of the plates 11 face each other across the Faraday-effect rotator 13. Shown at 1 and 4 in FIG. 6 are optical fibers as light passages. The isolator functions nearly in the same manner as that shown in FIG. 1.

Since the diameter of each of the lenses provided in the above-mentioned conventional optical isolators in order to cause each of them to function as a fiber collimator to transmit the light from one of the optical fibers to the other is much larger than that of the fiber, the entire size of the isolator is large. This is a problem. Since the distance from the light outlet end of one of the optical fibers to the nearby lens of the optical isolator and that from the other lens thereof to the light inlet end of the other of the fibers need to be optimized while the state of the optical path for the light transmitted through the lens and the intensity of the light are monitored, it takes much time and trouble to assemble the fiber collimator. This is also problematic.

FIG. 3 shows a conventional optical fiber collimator in which spherical lenses 23 and 24 are connected to the mutually opposed ends of optical fibers 21 and 22 so that the rays of light transmitted through one of the fibers are made parallel with each other. FIG. 4 shows another conventional optical fiber collimator in which rod lenses 25 and 26 of the refractive index distribution type are connected to the mutually opposed ends of optical fibers 21 and 22 so that the rays of light transmitted through one of the fibers are made parallel with each other.

However, from standpoints of the efficiency and cost of production, the conventional optical fiber collimators have problems that the locations of the optical fibers and the lenses need to be modulated and fixed with the accuracy of the micron order, and anti-reflection coatings need to be provided on the lenses to prevent the light from being reflected due to the difference between the refractive indices of each components.

SUMMARY OF THE INVENTION

The present invention was made in order to solve the above-mentioned problems. Accordingly, it is an object of the invention to provide an optical fiber functional device which is easy to assemble the parts thereof as an optical fiber collimator or the like and is compact and high in reliability. It is another object of the invention to provide a method of manufacturing the device.

The optical fiber functional component is provided to process a light beam between optical fibers, and is characterized in that single-mode optical fibers for processing the light beam are concentrically connected at the mutually opposed ends thereof to convergence-type rod lenses each having a prescribed length and made of a graded-index optical fiber of a diameter not less than that of the single-mode optical fiber but not more than two times of the latter diameter.

After the single-mode optical fibers of the optical fiber functional device provided in accordance with the present invention are concentrically connected at the mutually opposed ends of the fibers to the graded-index optical fibers, each of the latter fibers is cut off to such a prescribed length as to maximize the diameter of the light beam. For example, a compact fiber collimator of low cost can be constituted by the device.

An optical fiber collimator of the present invention is characterized in that two graded-index optical fibers each having a prescribed length are connected to two single-mode optical fibers at the mutually opposed ends thereof, respectively, and opposed to each other.

Another optical fiber collimator of the present invention is characterized in that two single-mode optical fibers are concentrically secured to both the ends of a graded-index optical fiber of prescribed length by melting or connector coupling; the intermediate portion of the latter fiber is removed by the cutoff thereof so that the space left by the portion is used for collimation.

Since the graded-index optical fiber (GI fiber) of each of the optical fiber collimators provided in accordance with the present invention functions as a lens because of the radial distribution of the refractive index of the fiber, it is connected to the single-mode optical fiber (SM fiber) to form the collimator. The graded-index fiber is manufactured in the vapor axial deposition (VAD) method. One of the reasons for this is that the radial distribution of the refractive index of the graded-index optical fiber can be smoothly changed in the VAD method. The other of the reasons is that since the VAD method does not include a solidification step included in other chemical vapor deposition method (MCVD method, OVD method, PCVD method etc.), the refractive index of the graded-index optical fiber does not decrease at the center of the fiber, which makes the lens have little loss of light. When the difference between the specific refractivities of the center and periphery of the graded-index optical fiber is 0.2% or more, it functions as a lens.

It is preferable that the diameter of the graded-index optical fiber is made larger than that of the single-mode optical fiber. If the former diameter is larger than the latter, more of light transmitted through the latter fiber can be entered into the former or a larger-diameter beam of mutually parallel rays can be obtained and it is easier to confirm a reference point for setting the length of the former fiber at the cutoff thereof. After the cut-off, the cut-off end of the former fiber can be subjected to polishing or electric discharge processing, to remove a cutoff-caused defect or the like from the end to reduce the loss of light in the fiber.

BRIEF DESCRIPTION OF THE DRAWINGS

FIG. 11 shows an optical fiber collimator which is an actual example of the present invention;

FIGS. 12(A), (B) and (C) shows an optical fiber collimator which is another actual example of the present invention;

DETAILED DESCRIPTION OF THE INVENTION

Preferred embodiments of the present invention will be described with reference to the drawings attached hereto. The technical essence of the present invention is that instead of a conventional lens, a rod lens having a diameter not largely different from an outer diameter of an optical fiber is integrally connected to the optical fiber in a fiber collimator mechanism.

Figure 1:
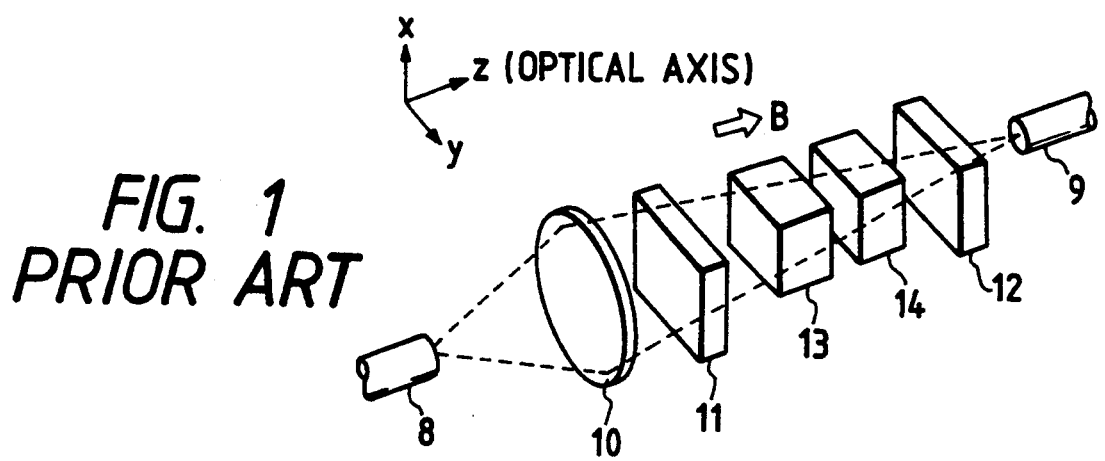
FIG. 1 is a perspective view of a convectional optical isolator to illustrate the constitution thereof and the light transmission passage thereof.
Figure 2:
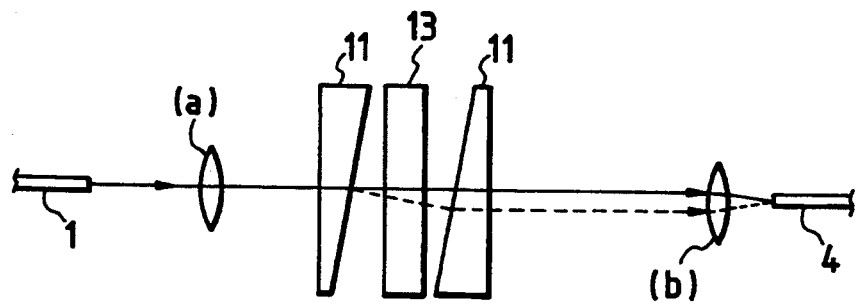
FIG. 2 is a sectional view of another conventional optical isolator to illustrate the constitution thereof and the light transmission passage thereof.
Figure 3:
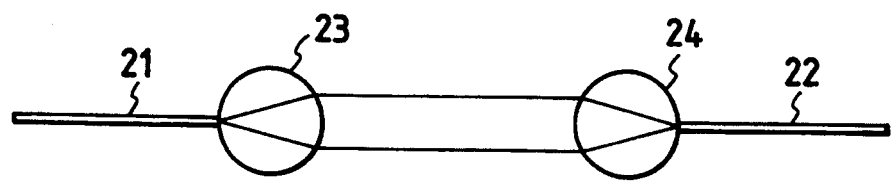
FIG. 3 shows the constitution of a conventional optical fiber collimator.
Figure 4:
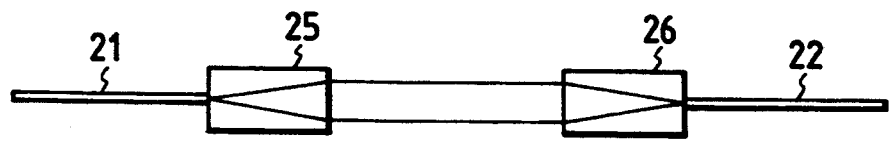
FIG. 4 shows the constitution of another conventional optical fiber collimator.
Figure 5A:
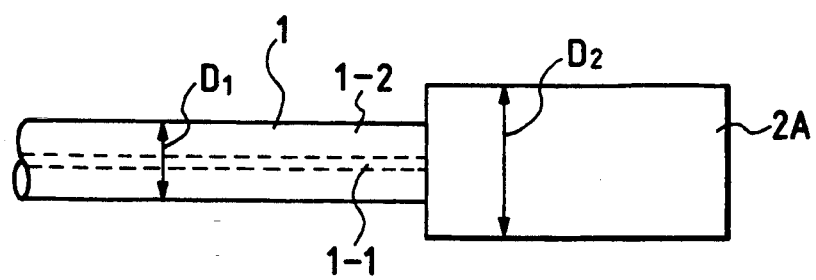
FIG. 5(A) shows the basic constitution of an optical fiber functional device which is an embodiment of the present invention.
Figure 5B:
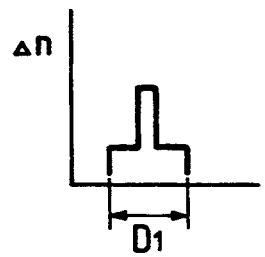
FIG. 5(B) shows the refractive index distribution of a single-mode optical fiber of the device of FIG. 5.
Figure 5C:
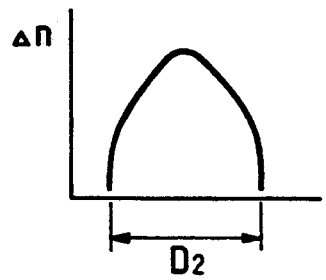
FIG. 5(C) shows the refractive index distribution of a rod lens of the device of FIG. 5(A)

FIG. 5(A) shows the basic constitution of an optical fiber functional device which is one of the embodiments. The device includes an optical fiber 1 having a core 1—1 and a cladding 1-2 surrounding the core, and a convergence-type rod lens 2A connected to the fiber. The fiber 1 is a single-mode optical fiber. The refractive indices n of the core 1—1 and cladding 1-2 of the fiber 1 are distributed stepwise as shown in FIG. 5(B). Symbol $\Delta n$ shown in FIG. 5(B) denotes the specific refractivity difference of the fiber 1. The rod lens 2A is made of a graded-index optical fiber and is connected to the single-mode optical fiber 1. The refractive index n of the lens 2A is distributed as shown in FIG. 5(C).

A method of manufacturing the optical fiber functional device by connecting the rod lens 2A of gradded-index optical fiber to the single-mode optical fiber 1 will be described with reference to FIGS. 6(A) to 6(D). The diameter of the core 1—1 of the fiber 1 is about 10 μm, while the outside diameter of the cladding 1-2 thereof is 125 μm. The diameter of the core of the graded-index optical fiber 2, from which the rod lens 2A is made, is 125 μm to 250 μm, while the outside diameter of the cladding is 250 μm or less.

Figure 6A:
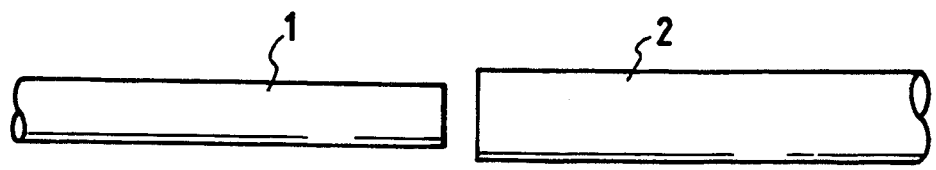
FIGS. 6(A) to 6(D) show the steps of a method of producing an optical fiber collimator of the present invention.
Figure 6B:
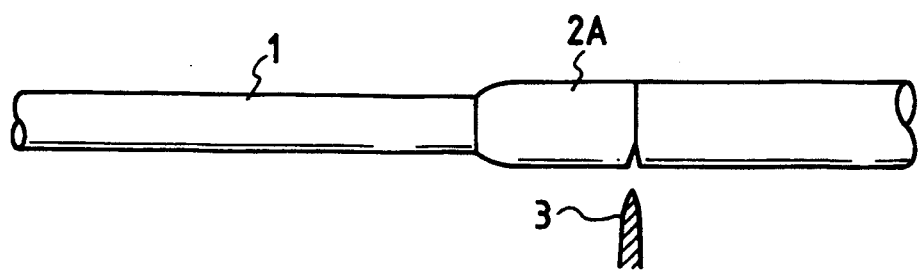

For the manufacturing, the optical fibers 1 and 2 are first aligned to each other as shown in FIG. 6(B), and are then connected to each other through melting as shown in FIG. 6(B). Since the diameters of the fibers 1 and 2 do not have such a large difference between themselves that one of the diameter is two times larger than the other or is equal to or less than a half of the latter, arc discharge or the like can be used for the melting to make it easy and high in reliability.

Figure 6C:
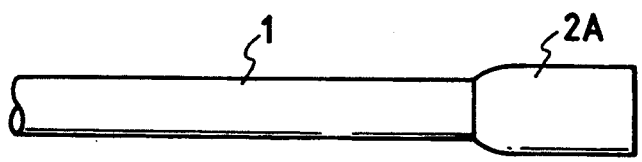
Figure 6D:
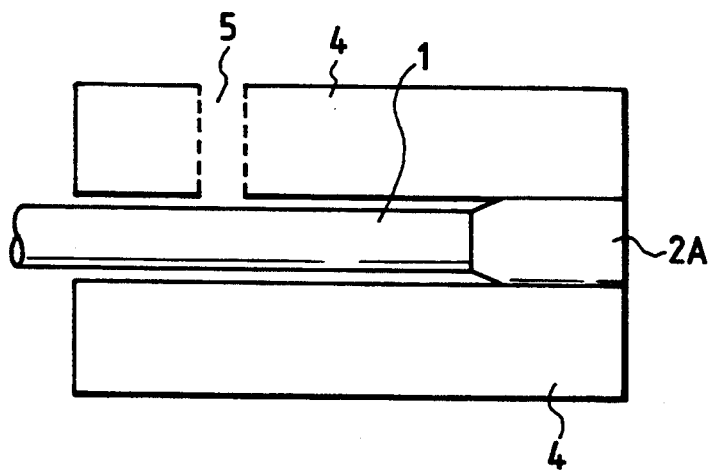

After the connection, the graded-index optical fiber 2 to be formed into the rod lens is cut off with an allowance by a cutter 3, as shown in FIG. 6(C), so that a fiber collimator of appropriate length can be constituted. The assembly of the fibers 1 and 2 is thereafter held in a ferrule 4 which is made of a transparent glass, as shown in FIG. 6(D). The cut-off end of the fiber 2 is then polished so that it has a prescribed length as the rod lens 2A. Since the ferrule is made of a transparent glass, the length of the lens can be measured from the outside by using a microscope or a projector. If the collimator is used to form an optical isolator described hereinafter, the polished end is provided with a coating for preventing the reflection of light on the end under air.

The reason why the diameter of the core of the graded-index optical fiber 2 is set at 125 μm or more is that the larger the diameter is, the larger the diameter of a light beam transmitted through the rod lens 2A can be made. If the diameter were more than 250 μm, it would be difficult to connect the fibers 1 and 2 to each other through melting. It is preferable that the specific refractivity difference Δn of the fiber 2 is 0.5% or more but is less than 1.5%. If the difference is less than 0.5%, the diameter of the light beam in the rod lens 2A becomes larger to make the beam likely to undergo abnormal scattering under the influence of the spatial irregularity of the refractive index distribution of the outer portion of the rod lens 2A. If the difference is 1.5% or more, the spatial irregularity of the refractive index distribution of the rod lens 2A becomes larger even at the center thereof due to the process of manufacturing of the lens to increase the scattering of the light beam in the lens.

Figure 16:
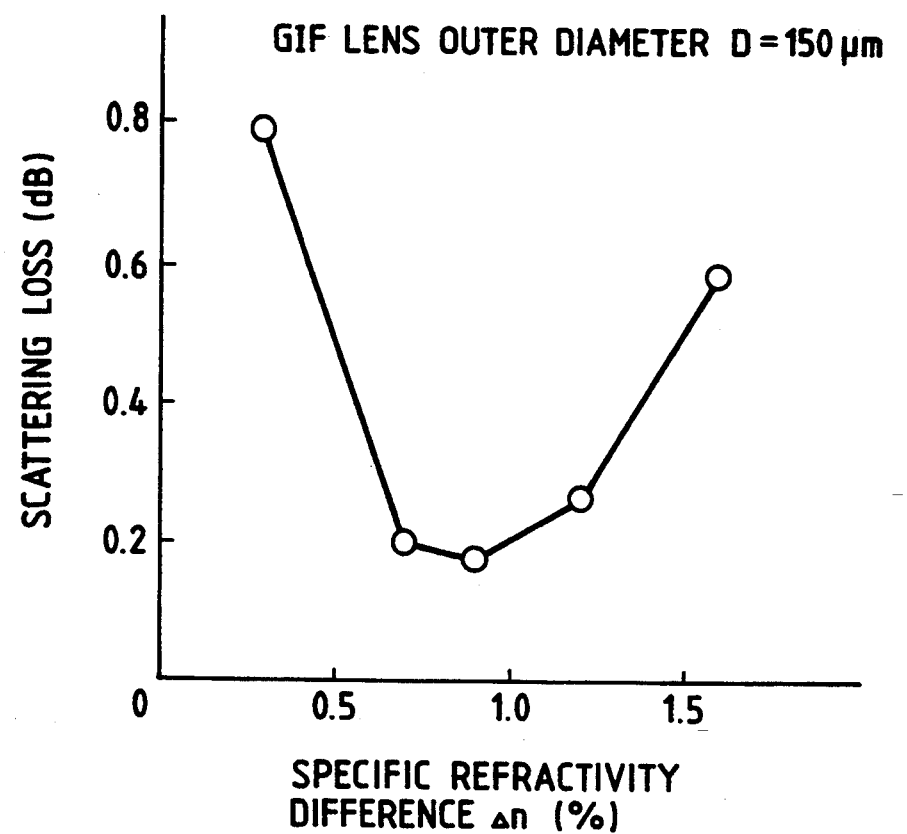
FIG. 16 shows the relation between the specific refractivity difference and scattering loss.

FIG. 16 shows the relation between the specific refractivity difference Δn and the scattering loss.

Incidentally, in FIG. 6(D), the ferrule 4 has an inlet 5 through which an adhesive for securing the fiber 1 and the rod lens 2A to the ferrule 4 is introduced. It is preferable that the ferrule 4 is made of a transparent glass which makes it possible to measure the length of the rod lens 2A while polishing the cut-off end thereof.

Figure 7:
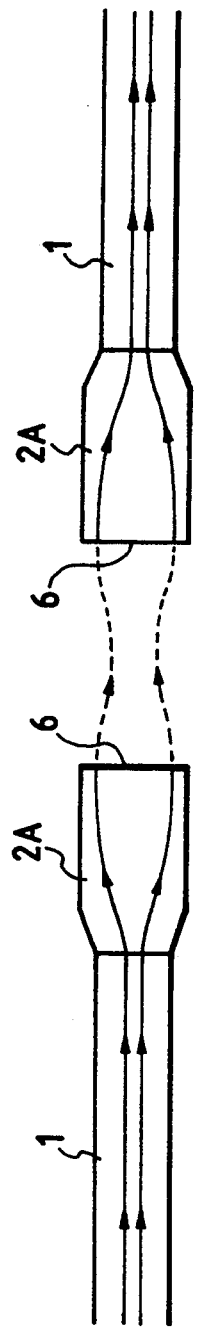
FIG. 7 conceptually shows the light transmission passage in a fiber collimator.

It is possible that a reflection preventive coating 6 is provided on the end of the rod lens 2A made of the graded-index optical fiber 2 and connected to the end of the single-mode optical fiber 1, and the coatings 6 of a pair of such assemblies are opposed to each other to form the fiber collimator, as shown in FIG. 7 which conceptually indicates the transmission of light through the collimator. Since the refractive index of the rod lens 2A of the light sending assembly is continuously decreased from the center of the lens toward the periphery thereof, the light transmitted through the core 1—1 of the optical fiber 1 of the assembly is curved in the rod lens so that the rays of the light go out in parallel with each other from the assembly at the reflection-prevented end thereof. The parallel rays of the light are thereafter received by the light receiving assembly at the end of the rod lens 2A thereof through a functional optical element disposed between the assemblies but not shown in FIG. 7, and are transmitted to the optical fiber 1 of the light receiving assembly through the rod lens 2A.

Figure 8:
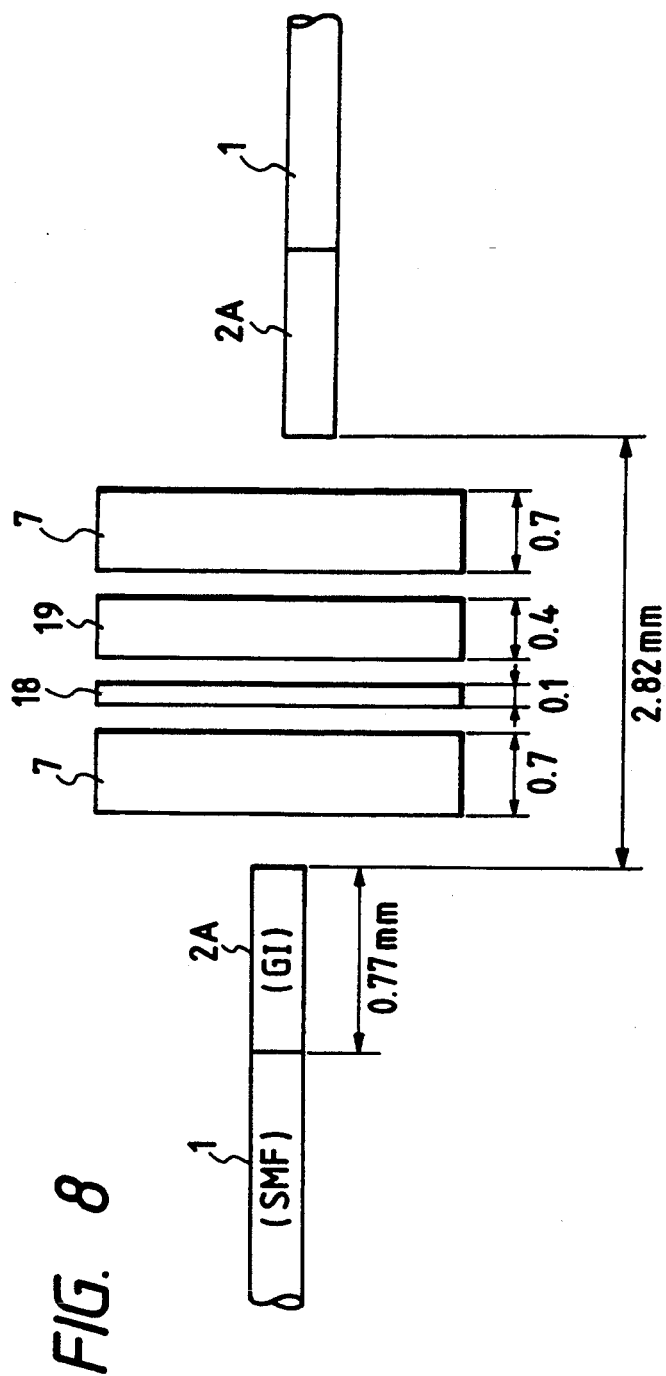
FIG. 8 shows the constitution of an optical isolator to which the present invention is applied.

FIG. 8 shows the constitution of the optical isolator employing such assemblies of optical fibers 1 and rod lenses 2A. The optical fibers 1 have the same dimensions as that shown in FIG. 6 and are connected to the rod lenses 2A. Each of the rod lenses 2A is 125 μm in diameter, 1% in specific refractivity difference, and 0.77 mm in length. Two parallel flat plates 7 of rutile crystals, a half-wavelength plate 18 and a Faraday-effect rotator 19 are disposed between the assemblies as shown in FIG. 8. The mutually opposed ends of the rod lenses 2A and both the sides of each of the optical elements 7, 18 and 19 are provided with to-air reflection preventive coatings for a wavelength of 1.55 μm.

The optical operation of such an optical isolator is known to the public, and is therefore not described herein. When the properties of the isolator shown in FIG. 8 were actually evaluated, it turned out that the isolator was as good as 0.60 dB in the loss of light in the forward direction and 40 dB in isolation. Besides, the isolator was actually so compact that it was 6 mm in diameter and 20 mm in length.

Although the optical isolator is described above as an example of application of the embodiment, it is not confined thereto but may be applied to the parallel-ray beam converters of various optical-fiber communication appliances or the like.

Figure 9:
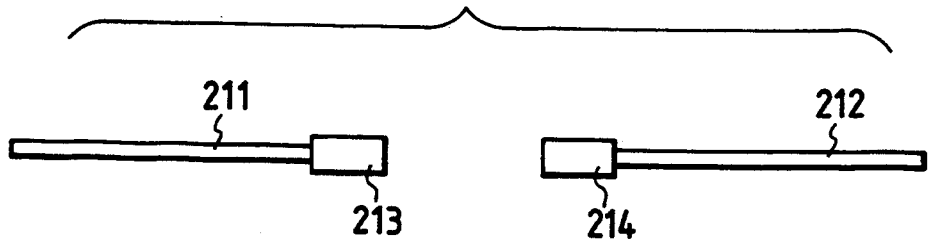
FIG. 9 shows an optical fiber collimator which is an embodiment of the present invention.

FIG. 9 shows an optical fiber collimator according to the present invention. The collimator includes single-mode optical fibers 211 and 212, and graded-index optical fiber lenses 213 and 214 manufactured in the VAD method. The lenses 213 and 214 are virtually concentrically connected to the fibers 211 and 212 through melting, respectively, and opposed to each other. The length of each of the lenses 213 and 214 is such that the rays of light transmitted through the fiber 211 or 212 connected to the lens are made parallel with each other.

Figure 10A:
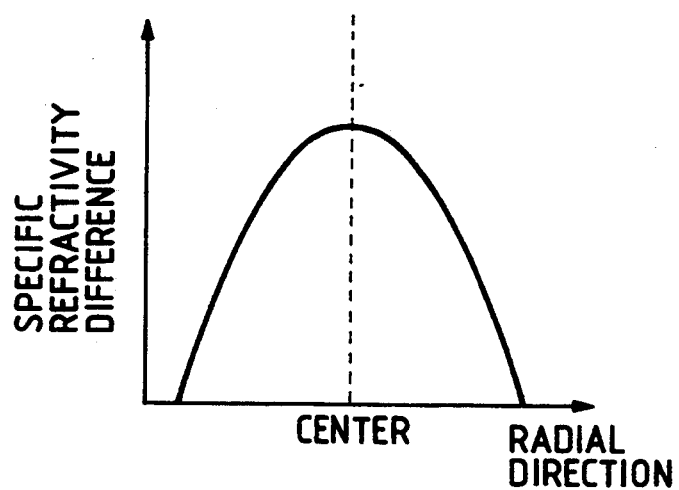
FIGS. 10(A) and (B) shows the radial distributions of the specific refractivity difference of optical fibers.
Figure 10B:
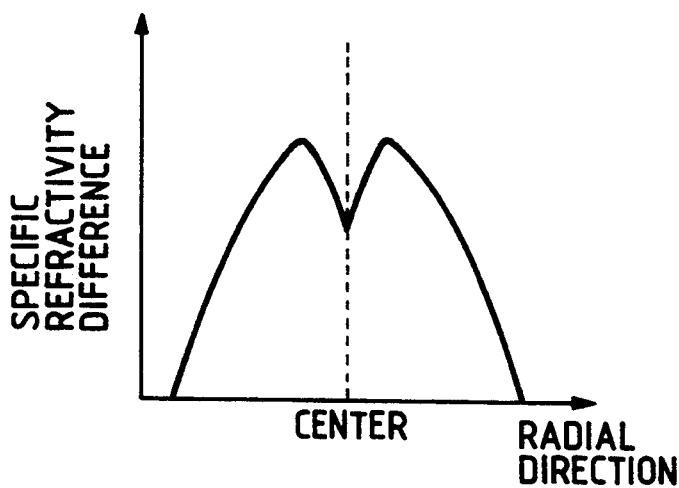

FIG. 10(A) shows the radial distribution of the specific refractivity difference of a graded-index optical fiber manufactured in the VAD method. FIG. 10(B) shows the radial distribution of the specific refractivity difference of a graded-index optical fiber manufactured in the MCVD (modified chemical vapor deposition) method. The difference of the latter fiber decreases at the center of the core of the fiber. However, the difference of the former fiber makes a change expressed by a function of nearly the square of the radius of the fiber. For that reason, the former fiber effectively operates as a lens. It is preferable that the difference has a distribution expressed by a function of 1.7-th to 2.5-th power of the radius of the fiber, because it is relatively easy to generate collimated light with the distribution. If the difference has a distribution expressed by a function of less than 1.7-th power of the radius of the fiber, collimated light is likely to diverge. If the difference has a distribution expressed by a function of more than 2.5-th power of the radius of the fiber, the collimated light is likely to converge.

EXAMPLE 1

A single-mode optical fiber which consisted of a core of 8 μm in diameter and an outer portion of 125 μm in outside diameter and had a specific refractivity difference of 0.35% between the core and the cladding, and a graded-index optical fiber which was manufactured by the VAD method and had a diameter of 130 μm, a specific refractivity difference of 0.7% between the center and periphery of the fiber, and a specific refractivity distribution expressed by the square of the radius of the fiber were concentrically connected to each other through melting under electric discharge heating. The graded-index optical fiber was thereafter cut off to a length of 0.9 mm plus/minus 10 μm. The cut-off end of the fiber was cleaned by electric discharge heating so that the fiber operated as a graded-index optical fiber lens. A pair of the assembly of the single-mode optical fiber and the graded-index optical fiber lens were opposed to each other to form an optical fiber collimator of the same constitution as that shown in FIG. 9. When the lenses of the collimator were opposed to each other across an air gap of 2.5 mm, the loss of light in the collimator was 0.2 dB.

EXAMPLE 2

FIG. 11 is a plan view of an optical fiber collimator which is example 2 and includes single-mode optical fibers 211 and 212, graded-index optical fiber lenses 213 and 214, silicon bases 215 and 216, spacers 217 and 218, and alignment pins 219 and 220. The silicon bases 215 and 216 have V-grooves shaped so that the axes of the single-mode optical fibers 211 and 212 and graded-index optical fibers coincide with each other when they are put in the V-grooves. The bases 215 and 216 have other grooves provided at both the sides of the V-grooves so that graded-index optical fibers secured in the latter grooves are concentrically opposed to each other when the alignment pins 219 and 220 are put in the former grooves to combine the bases together.

To manufacture the collimator, the graded-index optical fibers, which were the same as those in Example 1, were secured in the V-grooves of the silicon bases 215 and 216, and then each was cut off to a thickness of 1.0 mm by a precision cutting machine. Both the ends of the fibers were thereafter polished so that they constituted the graded-index optical fiber lenses 213 and 214 each having a thickness of 0.9 mm plus/minus 3 $\mu$m. The single-mode optical fibers 211 and 212 were then secured in the other V-grooves of the silicon bases 215 and 216 concentrically to the lenses 213 and 214. After that, the alignment pins 219 and 220 were put in the grooves of the bases 215 and 216 at both the sides of the V-grooves thereof so that the bases were secured to each other with the spacers 217 and 218 each having a length of 2.5 mm and disposed between the bases, and the fibers 211 and 212 and the lenses 213 and 214 were concentric to each other. The loss of light in the collimator with the lenses 213 and 214 opposed to each other across an air gap of 2.5 mm was 0.2 dB.

EXAMPLE 3

FIG. 12 shows an optical fiber collimator which is example 3 and includes single-mode optical fibers 211 and 212, and graded-index optical fiber lenses 213 and 214. To manufacture the collimator, the single-mode optical fibers 211 and 212 were concentrically connected to both the ends of a graded-index optical fiber 221 of 4.3 mm in length through melting, as shown in FIG. 12(A). The fibers 211, 212 and 221 were then put in the V-grooves of a silicon base 222, and secured by a securing member 223 and an adhesive 224, as shown in FIG. 12(B). The length of the securing member 223 was made equal to that of the fiber 221 so that the points of cutoff thereof after the securing can be confirmed. The 2.5 mm-length intermediate portion of the fiber 221 was thereafter removed by the cutoff thereof. Generally speaking, the length of the fiber 221 was equal to the sum of two times of the length of the lens and the collimate length. The length of the removed intermediate portion of the fiber is the collimation length. The graded-index optical fiber lenses 213 and 214 connected to the single-mode optical fibers 211 and 212 through the melting were thus made of the remaining portions of the cut-off fiber 221, as shown in FIG. 12(C). The loss of light in the collimator with the lenses 213 and 214 opposed to each other across an air gap of 2.5 mm was 0.2 dB.

EXAMPLE 4

Although the graded-index optical fiber and single-mode optical fiber of each of the collimators of examples 1, 2 and 3 were connected to each other through melting, the fibers might not be connected to each other through the melting but by an optical connector as described from now on.

Figure 13:
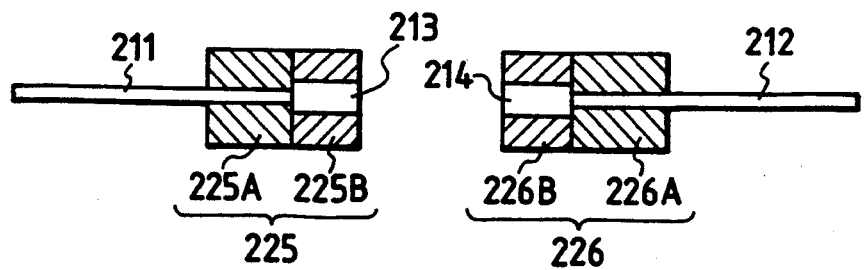
FIG. 13 shows an optical fiber collimator which is yet another actual example of the present invention.

FIG. 13 shows an optical fiber collimator which includes single-mode optical fibers 211 and 212, graded-index optical fiber lenses 213 and 214 concentrically opposed to each other, and optical connectors 225 and 226. The fiber 211 and the lens 213 were connected to each other by the optical connector 225 composed of portions 225A and 225B. The other fiber 212 and the other lens 214 were connected to each other by the other optical connector 226 composed of portions 226A and 226B.

EXAMPLE 5

Figure 14:
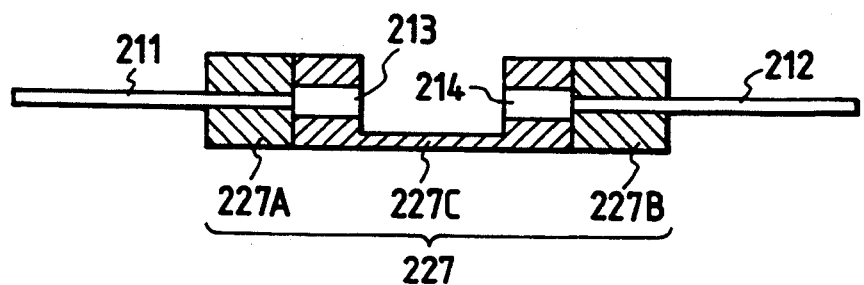
FIG. 14 shows an optical fiber collimator which is yet another actual example of the present invention.

FIG. 14 shows an optical fiber collimator which includes single-mode optical fibers 211 and 212, and graded-index optical fiber lenses 213 and 214 concentrically opposed to each other, and an optical connector 227 composed of portions 227A, 227B and 227C and connecting the fiber 211 and the lens 213 to each other and the other fiber 212 and the other lens 214 to each other. The constitution of the collimator corresponds to that of the collimator shown in FIG. 12.

EXAMPLE 6

Figure 15:
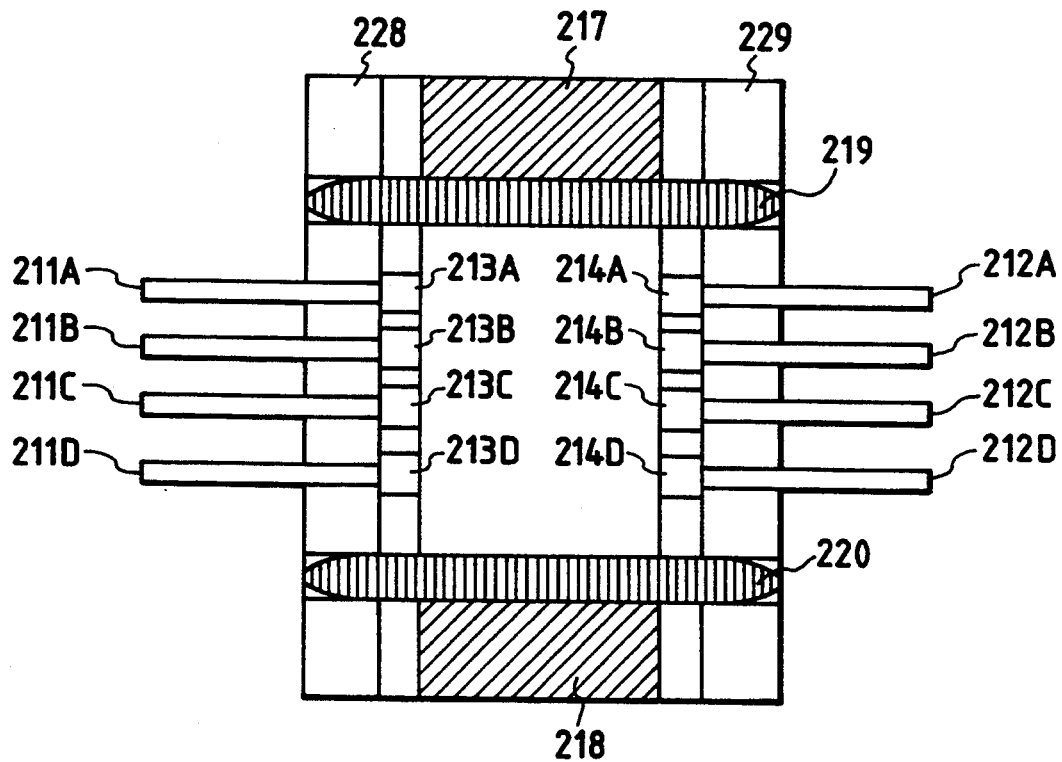
FIG. 15 shows an optical fiber collimator which is yet another actual example of the invention.

FIG. 15 is a plan view of a multi-line optical fiber collimator which is a modification of that shown in FIG. 11, and includes single-mode optical fibers 211A, 211B, 211C, 211D, 212A, 212B, 212C and 212D, graded-index optical fiber lenses 213A, 213B, 213C, 213D, 214A, 214B, 214C and 214D, spacers 217 and 218, alignment pins 219 and 220, and silicon bases 228 and 229. The fibers 211A, 211B, 211C and 211D were concentrically connected to the lenses 213A, 213B, 213C and 213D, respectively. The other fibers 212A, 212B, 212C and 212D were concentrically connected to the other lenses 214A, 214B, 214C and 214D, respectively. The alignment pins 219 and 220 were put in the V-grooves of the bases 228 and 229 so that they were coupled to each other with the spacers 217 and 218, and the former lenses were opposed to the latter lenses across a prescribed gap.

As described above, in an optical fiber functional device provided in accordance with the present invention, single-mode optical fibers for processing a light beam are concentrically connected at the mutually opposed ends of the fibers to convergence-type rod lenses each having a prescribed length and made of a graded-index optical fiber of a diameter not less than that of the former fiber but not more than two times of the latter diameter, so that the component is simple and compact in constitution and high in reliability. The invention can be effectively applied to the optical isolator of an optical fiber amplifier in particular.

Also, in an optical fiber collimator provided in accordance with the present invention, graded-index optical fibers manufactured in the VAD method are concentrically connected as convergence-type rod lenses to the mutually opposed ends of single-mode optical fibers for processing a light beam, so that the collimator is constituted to be simple and compact. The construction of the collimator can be applied to an optical isolator or the like, in which a component is disposed between optical fibers.

What is claimed is:

1. An optical fiber functional device for processing a light beam between optical fibers, comprising:
   a first single-mode optical fiber concentrically connected to a first convergence-type rod lens made of a graded-index optical fiber; and
   a second single-mode optical fiber concentrically connected to a second convergence-type rod lens made of a graded-index optical fiber, said first convergence-type rod lens being confronted with said second convergence-type rod lens;
   wherein the difference between specific refractivities of a center and a periphery of each of said first and second graded-index optical fibers is between 0.5%, inclusive, and 1.5%.

2. An optical fiber functional device as claimed in claim 1, wherein the distribution of a refractive index of each of said first and second graded-index optical fibers is expressed by a function of 1.7-th to 2.5-th power of a radius of said respective graded-index optical fibers.

3. A method of manufacturing an optical fiber functional device, comprising the steps of:
   connecting concentrically a single-mode optical fiber for processing a light beam, through melting, to a graded-index optical fiber having a diameter between than that of said single-mode optical fiber and two times that of said single-mode optical fiber;
   cutting off said graded-index optical fiber to a prescribed length including a finishing allowance;
   holding said single-mode optical fiber and said graded-index optical fiber concentrically connected to each other by a ferrule which is made of a transparent glass; and
   polishing optically a cut-off end of said graded-index optical fiber held by said ferrule so that said graded-index optical fiber has a prescribed length.

4. An optical fiber functional device, comprising:
   a multimode graded-index optical fiber with a prescribed length;
   two single-mode optical fibers concentrically secured to both ends of said graded-index optical fiber by one of melting and connector coupling; and
   a space for collimation formed by removing an intermediate portion of said multimode graded-index optical fiber by cutoff, wherein said space is adapted to receive an optical element.

5. An optical fiber functional device as claimed in claim 4, wherein said prescribed length is equal to the sum of two times of the length of a lens made of said cut-off graded-index optical fiber and the length of said space.

6. An optical fiber functional device as claimed in claim 1, wherein said graded-index optical fibers are put in V-grooves of bases so that said graded-index optical fibers are aligned to each other with spacers through the use of alignment pins.

7. An optical fiber functional device comprising:
   a single-mode optical fiber; and
   a convergence-type rod lens made of a multimode graded-index optical fiber and concentrically connected to an end of said single-mode fiber;
   wherein a diameter of said graded-index optical fiber is between that of said single-mode optical fiber, inclusive, and two times that of said single-mode optical fiber.

8. A method of manufacturing an optical fiber functional device as claimed in claim 3, further comprising the step of cleaning a cut-off end of said graded-index optical fiber by electric discharging heating.

9. A method of manufacturing an optical fiber functional device, comprising the steps of:
   disposing a multimode graded-index optical fiber in a V-groove of a base formed from a material selected from the group of silicon and glass;
   cutting said graded-index optical fiber to a prescribed length;
   polishing both end of said graded-index optical fiber to form a graded-index fiber lens; and
   fixing a single-mode optical fiber so that a center of said single-mode optical fiber is coincident with a center of said graded-index optical fiber.

* * * * *